United States Patent [19]
Johnson

[11] 3,756,439
[45] Sept. 4, 1973

[54] BOAT TRAILER SUPPORT

[76] Inventor: Lawrence N. Johnson, Box 251 A, Rt. 1, Spokane, Wash.

[22] Filed: Oct. 19, 1971

[21] Appl. No.: 190,520

[52] U.S. Cl............. 214/84, 193/35 C, 280/414 R
[51] Int. Cl............................................. B60p 1/52
[58] Field of Search...................... 214/84, 505, 506; 280/414 R; 193/35 R, 35 SS, 35 C

[56] References Cited
UNITED STATES PATENTS

| | | | |
|---|---|---|---|
| 3,155,249 | 11/1964 | Johnson | 214/84 |
| 3,077,277 | 2/1963 | Holzman | 214/84 |
| 2,827,304 | 3/1958 | Backus | 214/505 X |

*Primary Examiner*—Albert J. Makay
*Attorney*—Norman H. Huff

[57] ABSTRACT

In a boat trailer having pivotally supported pairs of hull support means, a torsion member interconnecting the said pairs and yieldably urging them toward parallelism.

4 Claims, 2 Drawing Figures

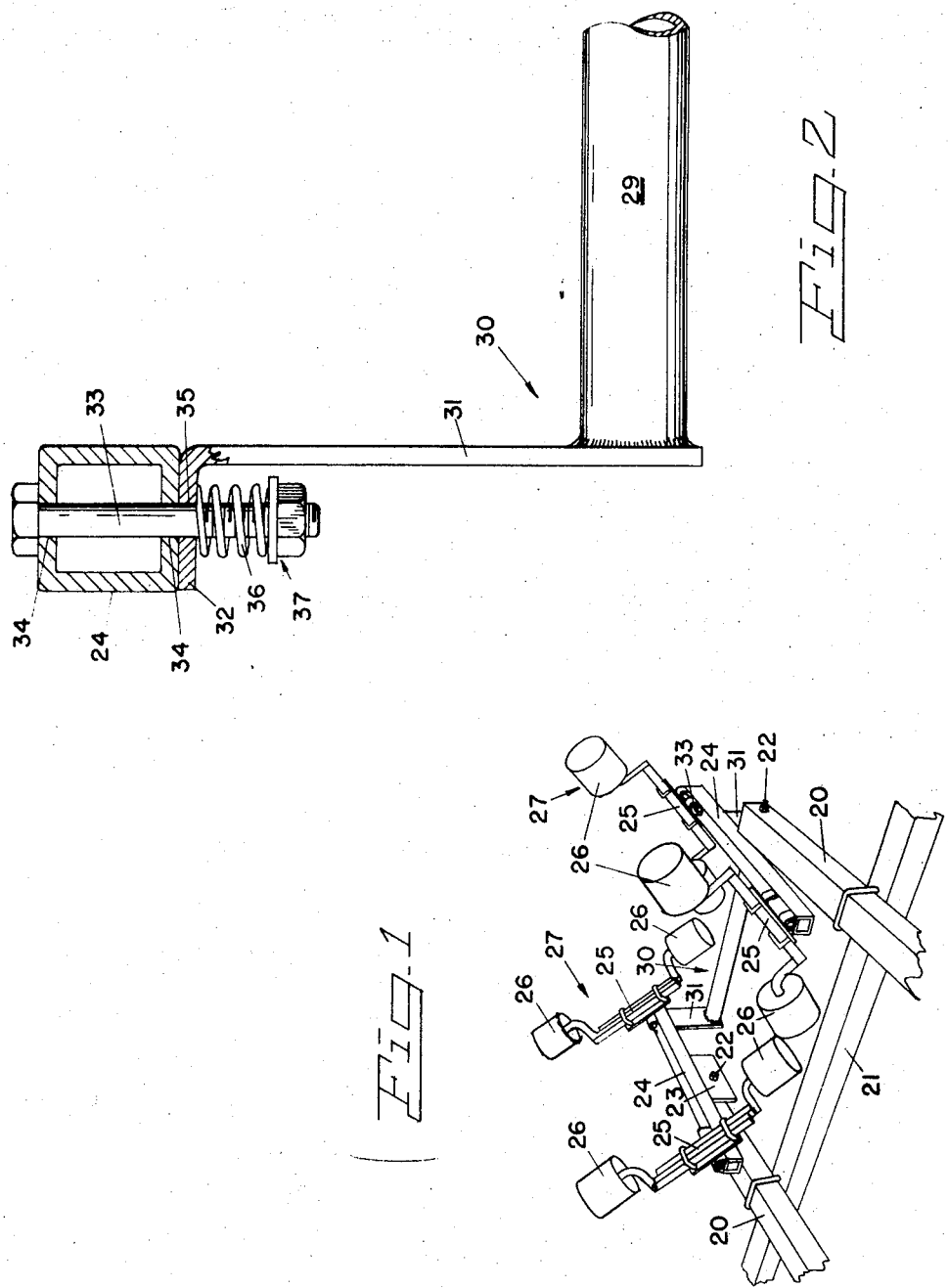

BOAT TRAILER SUPPORT

BACKGROUND OF THE INVENTION

This invention is a boat support alignment mechanism of novel construction and is an improvement over my prior patented invention entitled "Boat Support for Trailers," dated Nov. 3, 1964 and numbered U.S. Pat. No. 3,155,249.

While there are many advantages secured by the disclosed structure, one of the most desireable features lies in the provision of means for aligning boat supports during the activity of loading a boat onto the trailer by drawing it forwardly onto the trailer mounted supports from the water.

Heretofore, trailers have been provided with supporting rollers for supporting and cradling a boat hull during the loading and unloading operation and also during the movement of the boat from one location to another by means of a trailer.

The rollers are normally constructed of at least a semi-rigid material and are journaled upon specific supports pivotally mounted upon the frame to conform to the hulls progressive contour changes longitudinally of the boat as the boat is drawn onto the trailer. The pressures exerted thereby are distributed proportionately and thus obviate localized stress.

Accordingly, it is an object of the present invention to provide an improved boat trailer.

A further object is to provide a yieldable torsion member adapted to align one of a pair of hull supports by utilizing pressures applied to its companion support.

Further objects will become apparent as the description proceeds.

The full scope of the invention will be easily understood from the accompanying drawings and the following description and claims.

FIG. 1 is a fragmentary perspective view of the rearward end of a trailer in accord with the present invention.

FIG. 2 is an enlarged fragmentary lateral section through the yieldable bracket attachment means.

Referring more particularly to the drawings, I have shown a pair of laterally spaced longitudinal side members 20—20 united by a cross-member 21 and together representing a trailer more fully disclosed in my aforesaid patent.

At the rear ends of the side members, I provide coaxial journals 22—22 each of which pivotally carries a plate 23 welded or otherwise secured to one of a pair of longitudinal members 24—24.

Each longitudinal member 24 has a pair of lateral arms 25—25 which may be adjustable in length and carry at their opposed ends rollers 26—26 journaled for rotation and adapted to contact and support the hull of a boat.

All of the foregoing is now public knowledge and in commercial practice. However, when a boat is being loaded with its keel disposed at an obtuse angle from the axis of the trailer, the hull contacts one support complex 27 causing it to pivot about journal 22, but the opposite support complex will remain in its original position often restricting easy movement of the boat onto the trailer. To improve the loading capabilities I provide a resilient means 30 adapted to urge the pair of longitudinal members 24—24 toward parallelism.

The means 30 constitutes a torsion member 29 which may have inherent resiliency and/or have brackets 31—31 with right angle horizontal flanges 32—32 which lie in face to face engagement with the lower face of its respective longitudinal member 24.

An elongate bolt 33 extends through aligned openings 34—34 and 35, and yieldably holds the bracket by means of a compression spring 36 encircling the end portion of the bolt and confined by a nut and washer combination 37. The aperture 35 is enlarged to provide means loosely attaching the bracket to its respective longitudinal member 24.

It is thus obvious that I have provided a spring biased centering means adapted to urge the longitudinal members toward parallelism.

Having thus described my invention I desire to secure by Letters Patent of the United States the following:

1. In a boat trailer having a rigid wheel-supported frame adapted for releasably connecting to a towing vehicle and a pair of longitudinal members supported on said frame for independent pivotal rotation about a substantially common transverse axis adjacent to the rear end of said frame;
    said longitudinal members each being pivotally mounted intermediate its ends in substantially identical fashion and extending rearwardly of said frame an equal distance to the other;
    a pair of lateral arms mounted intermediate their lengths one at each end of each said longitudinal member and independently rockable about an axis parallel to the longitudinal member on which it is mounted;
    a roller journaled at each end of each arm and disposed to contact the hull of a boat being drawn in a forward direction relative to said frame; the improvement, comprising:
    an interconnecting member yieldably urging said pair of longitudinal members toward parallelism and yieldable to predetermined force to effect misalignment.

2. The invention defined in claim 1 wherein said member comprises a yieldable torsion bar interconnecting each longitudinal member to the other of said pair.

3. The invention defined in claim 2 wherein said torsion member comprises:
    a torque member having radially disposed brackets fixed at the ends of said torque member;
    means loosely attaching said brackets to said pair of longitudinal members; and
    spring biased centering means yieldably holding said brackets midway their movement limits with respect to each longitudinal member.

4. The invention defined in claim 3 wherein the means loosely attaching each bracket to the longitudinal member comprises an elongate bolt extending through a loose fitting aperture in said bracket; and
    a compression spring confined by said bolt and exerting pressure upon said bracket.

* * * * *